C. G. WILLIAMS.
COTTON CHOPPER AND SCRAPER.
APPLICATION FILED MAY 31, 1911.

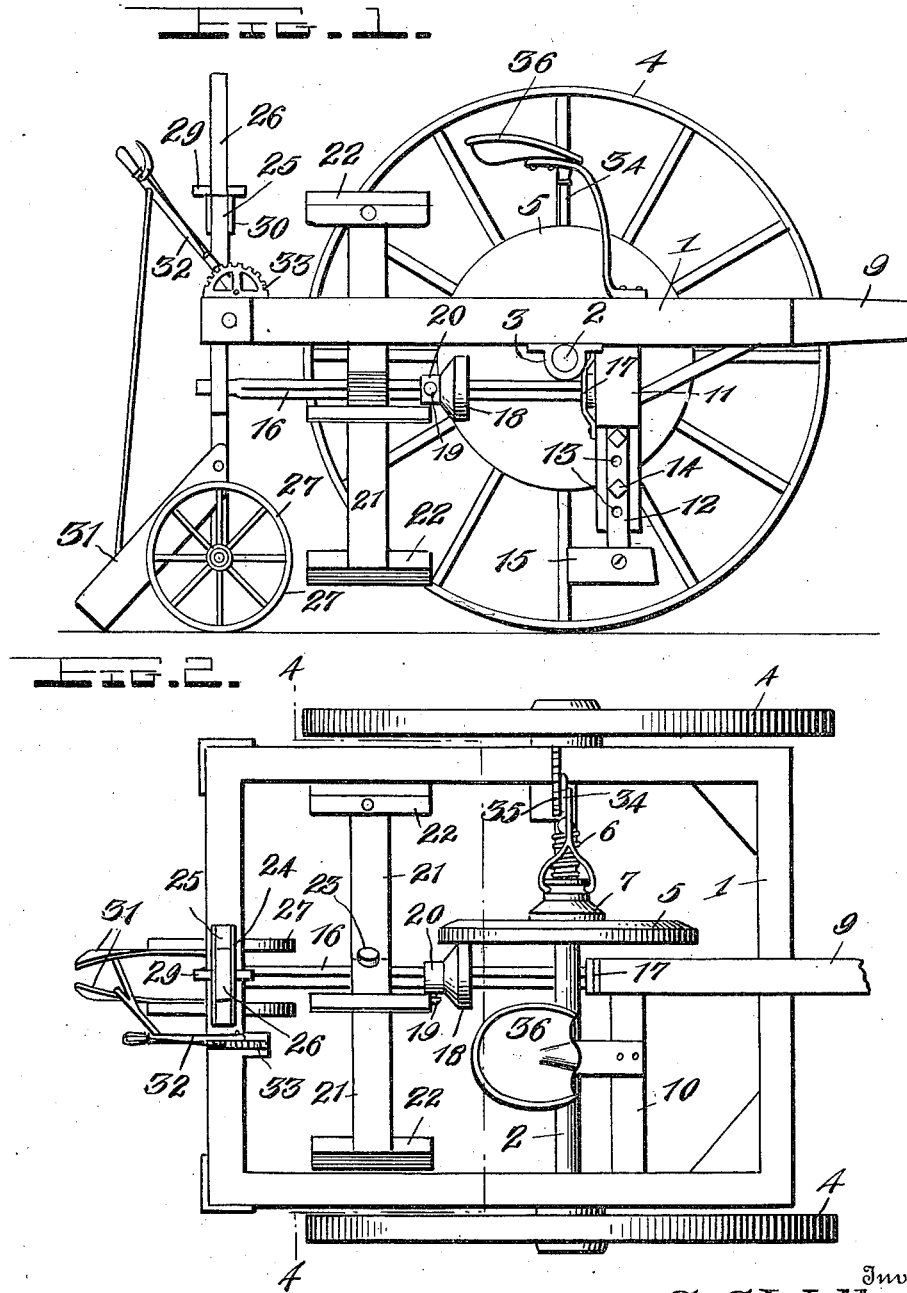

1,004,948.

Patented Oct. 3, 1911.

2 SHEETS—SHEET 2.

Witnesses
Chas. L. Griestauer.
L. G. Ellis.

Inventor
C. G. Williams,
By Watson E. Coleman,
Attorney

UNITED STATES PATENT OFFICE.

CHARLES G. WILLIAMS, OF SUMNER, MISSISSIPPI, ASSIGNOR OF ONE-FOURTH TO R. L. WARD, OF SUMNER, MISSISSIPPI.

COTTON CHOPPER AND SCRAPER.

1,004,948.   Specification of Letters Patent.   Patented Oct. 3, 1911.

Application filed May 31, 1911. Serial No. 630,381.

*To all whom it may concern:*

Be it known that I, CHARLES G. WILLIAMS, a citizen of the United States, residing at Sumner, in the county of Tallahatchie and State of Mississippi, have invented certain new and useful Improvements in Cotton Choppers and Scrapers, of which the following is a specification, reference being had to the accompanying drawings.

My invention relates to new and useful improvements in cotton cultivators and more particularly to a cotton chopper and scraper, and my object is to provide a device of this character in which the chopping attachment is driven through a friction means operated by the propulsion of the machine.

A further object of the invention resides in providing a spring-held friction disk on the axle of the vehicle and an additional friction disk in contact therewith carried on the axle of the chopping wheel.

A further object of the invention resides in the provision of scrapers and adjustable plows on the machine, and a still further object is to provide means whereby the chopping wheel may be adjusted with respect to the ground.

A still further object resides in providing a device which is extremely simple and economical in construction, therefore readily and cheaply manufactured, and one which is very effective and useful in operation.

With these and other objects in view, my invention consists in the novel features of construction, combination and arrangement of parts as will be hereinafter referred to and more particularly pointed out in the specification and claims.

Figure 3:
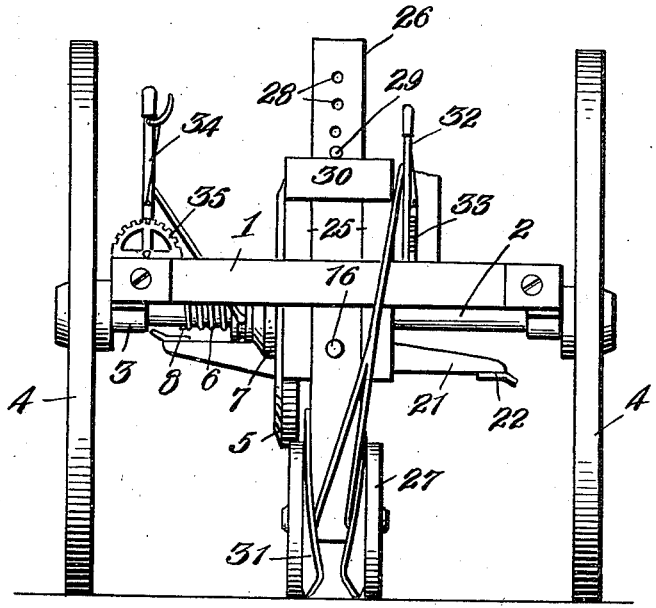
Figure 4:
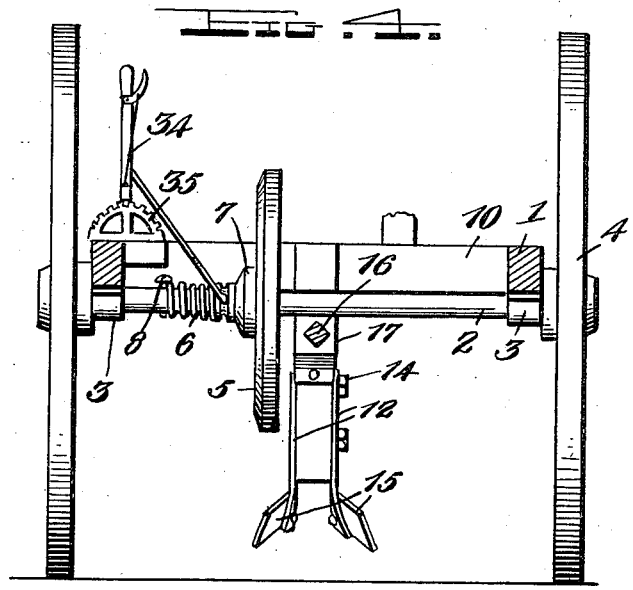

In the accompanying drawings forming a part of this application, Figure 1 is a side elevation of the device with a portion of the wheel nearest the observer removed. Fig. 2 is a top plan view thereof. Fig. 3 is a rear end elevation of the machine, and Fig. 4 is a transverse section as seen on line 4—4, Fig. 2.

In carrying out my invention, I shall refer to the drawings in which similar reference characters designate corresponding parts throughout the several views and in which—

1 indicates a frame of the usual or any preferred size and shape oscillatingly mounted on an axle 2, said frame being provided with bearings 3 on the lower faces thereof to receive said axle, and carried on the ends of said axle so as to rotate therewith, are the drive wheels 4. Keyed on the axle 2 so as to also rotate therewith, is a large friction disk 5, said disk being slidably mounted, however, on the axle and held in one position by means of a coil spring 6, one end of which is engaged with the hub 7 of said friction disk and the other with a bolt 8 or the like mounted in said axle. As stated, this spring retains said friction disk normally in position, which position is its effective one, and will me hereinafter more particularly described.

The frame 1 is provided with the usual form of tongue 9 which extends a short distance within the frame 1 beyond the forward end thereof and is braced to one side of said frame by means of a bracing bar 10, and said tongue is provided with a dependent arm 11, to the lower end of which a pair of arms 12 is disposed on opposite faces of said arm 11. These arms are adjustably secured to the arm 11 by providing the same and said arm with a plurality of registering openings 13, whereby a bolt 14 may be inserted therethrough and a nut engaged with the end of said bolt, and the lower ends of said arms 12 which depend below the lower end of the arm 11 are provided with the scraper blades 15, said blades being disposed at an angle to one another by having the lower ends of said arms 12 slightly twisted.

Extending longitudinally of the frame 1 and below the plane of the axle 2, is an additional axle or shaft 16, which shaft has the greater portion thereof square in cross section, and has the forward end thereof rotatably mounted in a bearing 17 formed in the rear face of the dependent arm 11. Slidably mounted on the shaft 16, is an additional but smaller friction disk 18 which is adapted to frictionally engage the disk 5, and in order to retain the disk 18 in any desired position on said shaft with respect to the disk 5, the set screw 19 is provided on a collar 20 of said disk, which is adapted to be turned home into engagement with the shaft 16. Also carried on the axle or shaft 16 to the rear of the friction disk 5, is a chopping wheel comprising a hub from which extends a plurality of radial arms 21, the ends of said arms being provided with the hoes or chopping blades 22. This chopping wheel is also slidable on the axle or shaft 16 and is held in any desired position by means of the set screw 23 which extends through the hub and is adapted to be turned into engagement with said axle 16.

The rear bar of the frame 1 is provided with a slot or the like 24 in which is mounted a pair of space bars 25 which extend above and below said rear bar of the frame, and slidably mounted between said bars 25, is a standard 26 which receives therein, one end of the shaft or axle 16. The lower end of the standard 26 is provided with a pair of wheels 27 which are adapted to rest upon the ground, and in order to provide means to retain the standard in any desired position and also adjust the same so as to adjust the relation of the chopping wheel with respect to the ground, said standard is provided adjacent its upper end with a plurality of registering openings 28, into which is inserted the pin 29, the same being adapted to contact with a cross piece 30 between the space bars 25. The engagement of the pin 29 with the cross piece 30 will, of course, limit the movement of the standard 26, in a downward direction and as said pin may be adjusted to any of the openings 28, it will be seen that the standard may be raised or lowered for the purpose specified. Also carried adjacent the lower end of the standard 26 between the wheels 27, are the plows 31, said plows having pivotal engagement with the standard and adapted to be raised or lowered into engagement with the ground by means of a lever 32 which has connection with said plows. A rack 33 carried on the frame adjacent the lever 32, is adapted to receive a spring detent carried by said lever, whereby the lever may be held in any desired position and correspondingly retain said plows in the position to which they are adjusted. An additional lever 34 is carried on the frame and has connection with the hub 7 of the friction disk 5, whereby when desired, said friction disk may be removed from its normal position to which it is forced by means of the spring 6, and in order to retain the friction disk in its ineffective position, a rack 35 is provided adjacent said lever 34 which is adapted to receive a spring detent carried thereby. In this manner, when it is desired to draw the device from place to place without operating the chopping wheel, the same may be readily accomplished by the operation of said lever 34. Also mounted on the brace bar 10 between the inner end of the tongue 9 and the side bars of the frame, is a seat 36 for the operator of the machine which may be mounted thereon in the usual or any preferred manner.

It has been before stated that the pin 29 in the standard 26 when resting on the upper edge of the cross bars 30, will limit the movement of said standard in a downward direction, but I have also provided means whereby said standard will be limited in its movement in an upward direction. In this connection, I will state that when the plows 31 are disposed downwardly, as shown in Fig. 1, and spaced from said space bars 25, in the same proportion as shown in the views of the drawing, the upper ends thereof are adapted to contact with the lower ends of said space bars, thereby limiting the upward movement of said standard 26. The shaft 16 which is rotatably mounted in said standard 26, has either end thereof projected a short distance beyond said standard, and when the plows 31 are disposed out of engagement with the ground and in a substantially horizontal position, the projected end of this shaft is adapted to act as a stop to limit the upward movement of said standard with respect to the frame, so that the shaft 16 may be considered as performing a double function.

From the foregoing description, it will be seen that I have provided a cotton chopping and scraping machine provided with a frictional means for the driving of the chopping mechanism. It will further be seen that the large friction disk is normally held in its effective position by means of a spring carried on the axle, and as said friction disk is slidably mounted on said axle, the same may be readily moved from its effective position when desired. Furthermore, it will be seen that the friction disk being yieldingly mounted on the axle, compensates for any obstructions which the chopping wheel may encounter in its operation, which, if there were a rigid connection between the disks, would cause a break in some portion of the machine. It will further be seen that in view of the adjustable standard in the rear of the frame, which receives the one end of the shaft carrying the cotton chopping wheel, said wheel may be adjusted with respect to the ground, for obvious purposes. Furthermore, it will be seen that when it is desired to move the machine from place to place without allowing the plows and the chopping wheel to engage the ground, the same may be accomplished by the operation of the levers 32 and 34, respectively. It will still further be seen that in view of the adjustability of the friction disk on the longitudinal shaft of the frame so that said disk may engage the other disk adjacent its central portion or adjacent its outer edge, the speed with which said shaft and correspondingly the chopping wheel is rotated, may be adjusted. It will still further be seen that my device is of such simple construction as to be readily and cheaply manufactured and one which is extremely effective and useful in operation.

What I claim is:—

1. The combination with a frame, an axle rotatably mounted thereon and drive wheels carried on the axle; of an arm depending from the forward end of said frame having scraper blades at the lower end thereof, an adjustable standard carried at the rear end of said frame carrying supporting wheels at the lower end thereof, a shaft extending longitudinally of the frame and having the ends thereof rotatably mounted, respectively, in said arm and adjustable standard, a chopping wheel carried on said shaft, and means to drive the shaft from the axle.

2. The combination with a frame, an axle rotatably mounted thereon and drive wheels carried on said axle; of an arm depending from the forward portion of said frame and provided on its lower end with scraper blades, a standard mounted in the rear portion of said frame and provided with supporting wheels on the lower end thereof, means to adjust said standard vertically of the frame, a shaft extending longitudinally of said frame and having the ends thereof rotatably mounted, respectively, in the arm and standard, a chopping wheel carried on said shaft, and means to rotate said shaft through the rotation of said axle.

3. In a device of the character described, the combination with a frame, said frame being provided with a slot in the rear portion thereof, an axle rotatably mounted thereon, and drive wheels carried on the axle; of a pair of space bars stationarily mounted in the slot of said frame, a standard slidably mounted in the slot of said frame between said space bars, supporting wheels mounted on the lower end of said standard, means to limit the movement of said standard, a shaft extending longitudinally of the frame and rotatably mounted therewithin, the rear end of said shaft being mounted in said slidable standard, a chopping wheel carried on said shaft, and means on the axle to rotate said shaft.

4. In a device of the class described, the combination with a frame, an axle rotatably mounted thereon, and supporting wheels mounted on said axle; of a standard slidably mounted on the rear portion of said frame, supporting wheels mounted on the lower end of said standard, means to limit the movement of said standard in a downward direction, a shaft extending longitudinally of the frame and rotatably mounted therewithin, one end of said shaft being mounted in said standard to project therebeyond, the projected end being adapted to limit the movement of said standard in an upward direction, a chopping wheel carried on said shaft, and means to rotate said shaft from the rotation of the axle.

In testimony whereof I hereunto affix my signature in the presence of two witnesses.

CHARLES G. WILLIAMS.

Witnesses:
J. M. DYER, Jr.,
S. A. MOHEAD.

---

Copies of this patent may be obtained for five cents each, by addressing the "Commissioner of Patents, Washington, D. C."